(12) United States Patent
Mercurio

(10) Patent No.: US 11,447,076 B1
(45) Date of Patent: Sep. 20, 2022

(54) MULTI-PURPOSE CARGO CARRIER FOR TRANSPORTING BICYCLES AND OTHER ITEMS BY A VEHICLE

(71) Applicant: James Ira Mercurio, Indianapolis, IN (US)

(72) Inventor: James Ira Mercurio, Indianapolis, IN (US)

(*) Notice: Subject to any disclaimer, the term of this patent is extended or adjusted under 35 U.S.C. 154(b) by 0 days.

(21) Appl. No.: 17/390,898

(22) Filed: Jul. 31, 2021

(51) Int. Cl.
  *B60R 9/10* (2006.01)
  *B60R 9/06* (2006.01)

(52) U.S. Cl.
  CPC . *B60R 9/10* (2013.01); *B60R 9/06* (2013.01)

(58) Field of Classification Search
  CPC .................................. B60R 9/06; B60R 9/10
  USPC ........................................................ 224/519
  See application file for complete search history.

(56) References Cited

U.S. PATENT DOCUMENTS

| | | | | |
|---|---|---|---|---|
| 3,720,333 A * | 3/1973 | Vaughn | ...................... | B60R 9/10 224/528 |
| 4,213,729 A * | 7/1980 | Cowles | ...................... | B60R 9/06 224/523 |
| 4,934,894 A * | 6/1990 | White | ...................... | B60R 9/06 414/537 |
| 5,011,361 A * | 4/1991 | Peterson | ................... | B60R 9/06 224/508 |
| 6,345,749 B1 * | 2/2002 | Hamilton | .................. | B60R 9/06 224/524 |
| 6,502,730 B2 * | 1/2003 | Johnson | .................... | B60R 9/10 224/924 |
| 6,783,315 B1 * | 8/2004 | Senechai | ................... | B60P 1/43 224/524 |
| 6,802,441 B1 | 10/2004 | DuRant et al. | | |
| 7,246,733 B2 * | 7/2007 | Threet | ...................... | B60R 9/06 224/498 |
| 7,316,339 B2 * | 1/2008 | Zhang | ..................... | B60R 9/06 224/524 |
| 7,686,562 B2 * | 3/2010 | Panzarella | ............ | B60P 1/4421 414/921 |
| 7,841,821 B2 * | 11/2010 | Miro | ......................... | B60R 9/08 224/524 |
| RE44,454 E | 8/2013 | Aghajanian | | |
| 9,033,641 B1 * | 5/2015 | Barefoot | ................... | B60P 3/06 414/462 |
| 9,333,822 B1 | 5/2016 | LaFave | | |
| 9,446,717 B2 * | 9/2016 | Gray | ........................ | B60R 9/06 |
| 9,902,333 B2 | 2/2018 | Gray | | |

(Continued)

*Primary Examiner* — Peter N Helvey
(74) *Attorney, Agent, or Firm* — Bruce J. Bowman

(57) ABSTRACT

A multi-purpose cargo carrier for coupling to a vehicle's tow hitch, carries sturdy bicycles, like mountain bicycles, electric bicycles, and the like, containers, coolers, and small items. The multi-purpose cargo carrier has a tow hitch connecting platform defining a first bicycle lane that receives front and rear wheels of a first bicycle, a second bicycle lane that receives front and rear wheels of a second bicycle, and a storage compartment between the first and second bicycle lanes. A hinged lid covers the storage compartment. A top of the lid defines a support for cargo. A plurality of catches and strap receivers are strategically situated about the platform providing cargo tie down locations. Each bicycle lane has pivoting front and rear wheel holders extending from lateral sides of the platform. Openings in the wheel holders receive portions of the wheels. Extensions of the front wheel holders provide generally vertical wheel stands.

20 Claims, 9 Drawing Sheets

(56) References Cited

U.S. PATENT DOCUMENTS

| | | | |
|---|---|---|---|
| 9,969,574 B2 * | 5/2018 | Robert | B65G 67/30 |
| 2008/0099522 A1 * | 5/2008 | Clausen | B60R 9/06 224/519 |
| 2008/0100076 A1 * | 5/2008 | Potts | B60R 9/06 296/3 |
| 2008/0206030 A1 * | 8/2008 | Reuille | B60P 3/07 254/362 |

* cited by examiner

MULTI-PURPOSE CARGO CARRIER FOR TRANSPORTING BICYCLES AND OTHER ITEMS BY A VEHICLE

FIELD OF THE INVENTION

The present invention relates to cargo carriers for transporting bicycles and other items by a vehicle through attachment of the cargo carrier to the tow hitch of the vehicle and, more particularly, to cargo carriers for transporting sturdy bicycles along with other cargo/items by a vehicle through attachment to the tow hitch of the vehicle.

BACKGROUND OF THE INVENTION

It is not always convenient, desirable or in some cases, even practical, to tow a trailer when transporting items such as bicycles, coolers, luggage, and the like. Rooftop carriers are impractical for unwieldy and/or heavy items such as electric bicycles, mountain bicycles and the like, loaded coolers, packed luggage and the like. Because of this, there are many products for transporting such items on the exterior of vehicles. One type of cargo carrier attaches to the tow hitch of the vehicle. Tow hitch cargo carriers are commonly used to transport items that would not easily fit onto a rooftop cargo carrier or would not warrant use of a trailer.

A lot of the prior art tow hitch cargo carriers have insufficient carrying capacity, are bulky or inconvenient to use. Others are simply not user friendly. One solution was to provide multiple hitch receivers that may be connected together at variable spacing and configurations so that multiple carriers may be installed on a vehicle simultaneously. Many cargo carriers hold only typical bicycles and are usually clamped to the carrier via the bicycle frame, which does not adequately hold the bicycle. Moreover, these types of bicycle carriers cannot hold sturdy or heavy bicycles. They also do not allow for carrying, stowing, or holding cargo such as coolers, containers, boxes as well as smaller items.

It would therefore be desirable to provide a tow hitch connecting cargo carrier that can hold sturdy bicycles and cargo such as containers, boxes, coolers, grills and the like, along with smaller items.

SUMMARY OF THE INVENTION

A multi-purpose cargo carrier for transporting bicycles and other items is configured for attachment to a tow hitch of a vehicle, and carries bicycles of all types particularly, but not necessarily, sturdy bicycles, such as, but not limited to, mountain bicycles, electric bicycles, hybrid bicycles, and the like, as well as containers, equipment, and small items, either together or separately.

The multi-purpose cargo carrier is characterized by a body defining a platform with a rear bicycle lane or guide that receives and holds the front and rear wheels of a first bicycle, a front bicycle lane or guide that receives and holds the front and rear wheels of a second bicycle, and a storage compartment with a preferably, but not necessarily, hinged lid situated between the front and rear bicycle lanes, and a plurality of catches strategically situated about the body providing tie down locations for all of the cargo. The storage compartment lid has an upper surface which, when closed and covering the storage compartment, defines a substantially planar support for coolers, containers, equipment, and/or other cargo.

The rear bicycle lane extends along a rearward portion of the platform and includes a first front wheel holder pivotally connected to a first lateral side of the platform, and a first rear wheel holder pivotally connected to a second lateral side of the platform opposite the first lateral side. The first front wheel holder has a first front wheel opening that receives a lower portion of the front wheel of the first bicycle, while the first rear wheel holder has a first rear wheel opening that receives a lower portion of the rear wheel of the first bicycle. The first front wheel holder has a first front wheel extension that pivots upward to form a generally vertical stand that receives a front portion of the first front wheel of the first bicycle.

The first front wheel holder may include a plate or other structure that is configured to contact the body in order to stop pivoting of the first front wheel holder when the first front wheel holder is generally co-planar with the platform. The first rear wheel holder may also include a plate or other structure that is configured to contact the body in order to stop pivoting of the first rear wheel holder when the first rear wheel holder is generally co-planar with the platform.

The second bicycle lane extends along a frontward portion of the platform opposite the rear of the platform and includes a second front wheel holder pivotally connected to the second lateral side of the platform, and a second rear wheel holder pivotally connected to the first lateral side of the platform. The second front wheel holder has a second front wheel opening that receives a lower portion of the front wheel of the second bicycle, while the second rear wheel holder has a second rear wheel opening that receives a lower portion of the rear wheel of the second bicycle. The second front wheel holder has a second front wheel extension that pivots upward to form a generally vertical stand that receives a front portion of the second front wheel of the second bicycle.

The second front wheel holder may include a plate or other structure that is configured to contact the body in order to stop pivoting of the second front wheel holder when the second front wheel holder is generally co-planar with the platform. The second rear wheel holder may also include a plate or other structure that is configured to contact the body in order to stop pivoting of the second rear wheel holder when the second rear wheel holder is generally co-planar with the platform.

The plurality of catches of the present cargo carrier includes, but is not limited to, eyelets on ribs or bracing of the body, eyelets internal to the storage compartment but accessible via one or more openings in the storage compartment lid, and slots strategically placed about the body for receiving tie-down straps and/or the like.

The present multi-purpose cargo carrier may also include a removable tie-down arm that extends laterally from the front of the platform. The tie-down arm includes several holes situated on a cross-bar of the tie-down arm for adjustable positioning of tie down fasteners.

Gear such as grills, griddles, flat tops, camping gear and the like, and/or various equipment may be carried on the support lid and secured to the platform via hardware (e.g., bolts, screws) or other hold or tie down methods/devices. The first and second front and rear bicycle wheel holders on each lateral side of the platform may be extended to form a side table that accepts a board, panel, sheet, slats, or the like to form a tabletop and/or cooking area.

Further aspects of the present invention will become apparent from consideration of the drawings and the following description of a form of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The present invention, its features and attributes, will be better understood by reference to the accompanying drawings, wherein.

Figure 1:
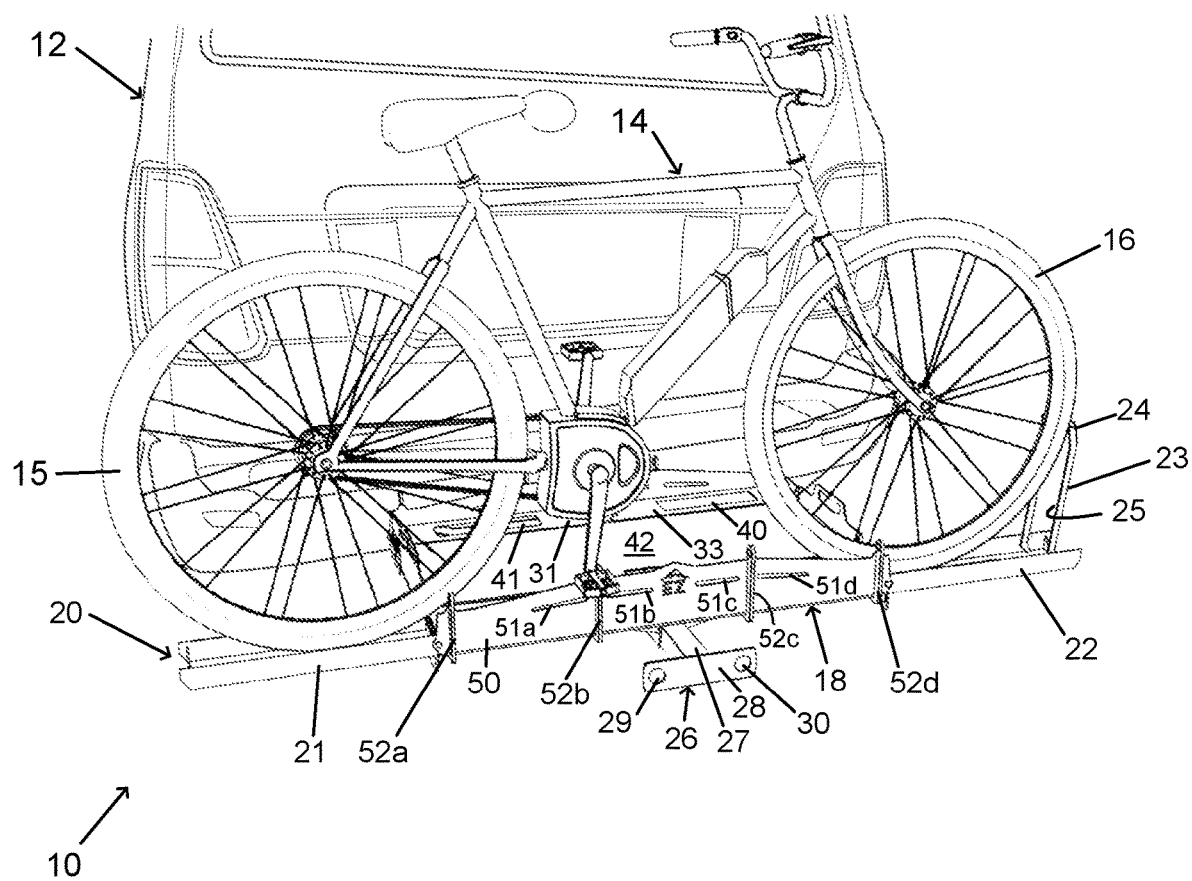
FIG. 1 is a rear view of an exemplary vehicle with an embodiment of a multi-purpose cargo carrier fashioned in accordance with the present principles, connected via a tow hitch of the vehicle, and shown carrying an exemplary electric bicycle, being positioned within one of the two bicycle holders of the multi-purpose cargo carrier.
Figure 2:
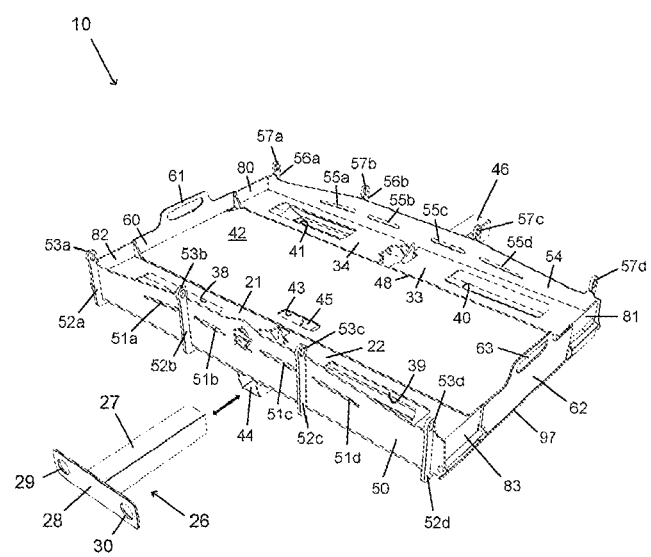
FIG. 2 is an upper front view of the multi-purpose cargo carrier of FIG. 1 without a bicycle and shown unattached from the vehicle, its extendable tie-down arm exploded from the carrier, and its bicycle wheel holders in a closed, folded, collapsed, or stowed position.
Figure 3:
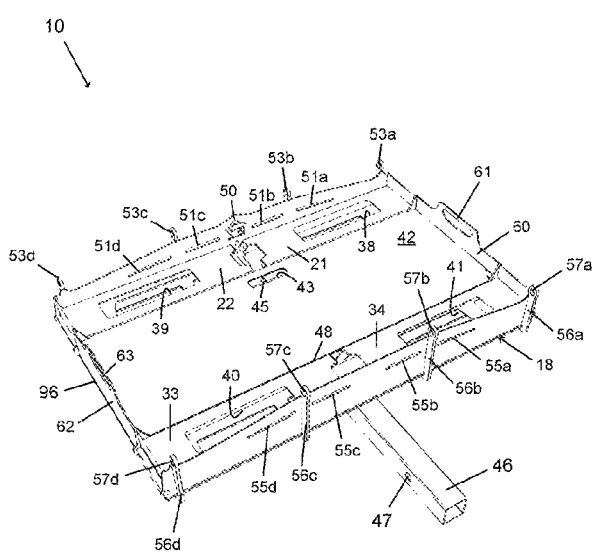
FIG. 3 is an upper rear view of the multi-purpose cargo carrier of FIG. 1 shown unattached from the vehicle, and the bicycle wheel holders in a closed, folded, collapsed or stowed position.
Figure 4:
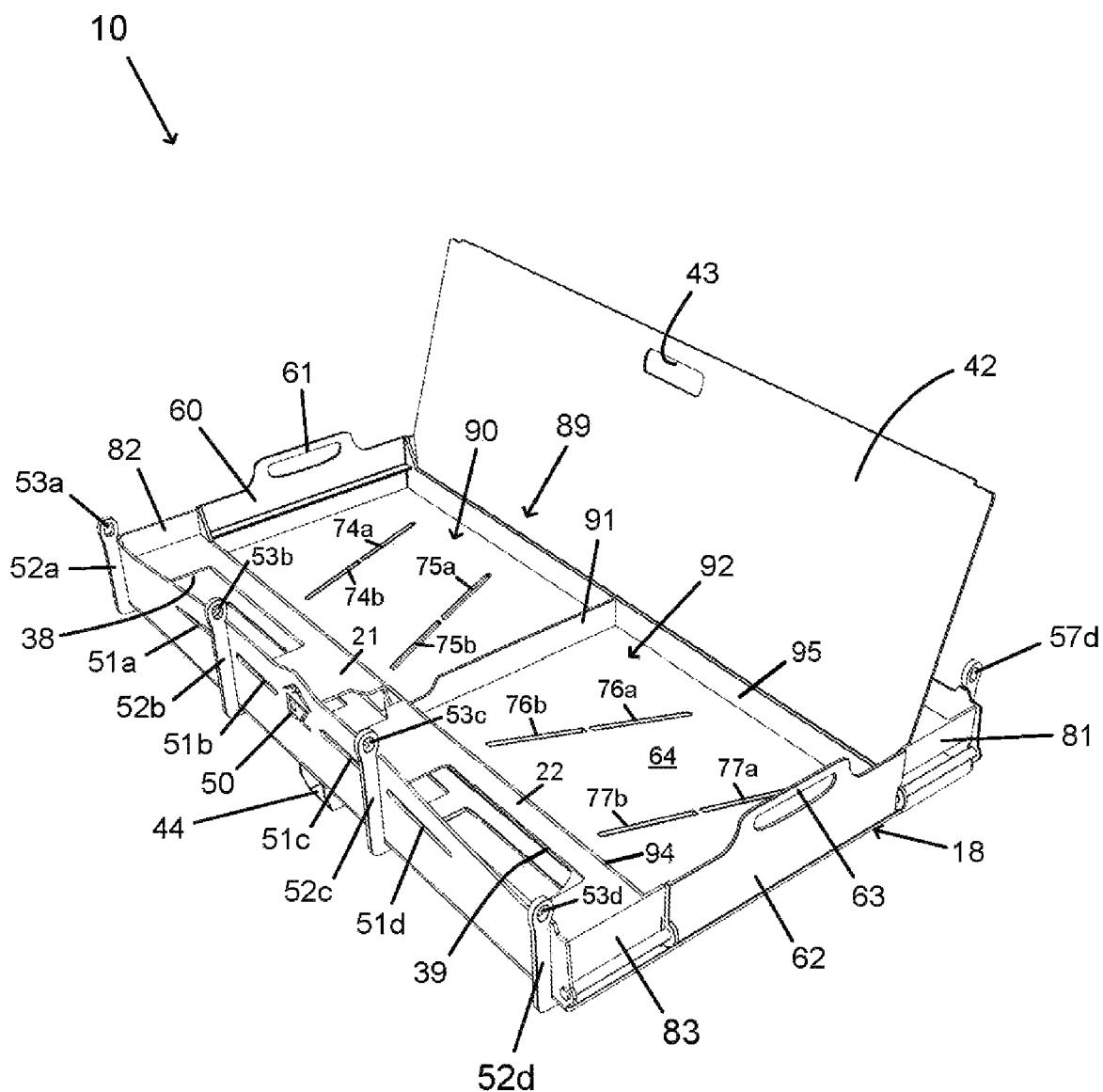
FIG. 4 is an upper lateral front view of the cargo carrier of FIG. 2 without the extendable tie-down, and the cover of the storage compartment of the multi-purpose cargo carrier in an open position.
Figure 5:
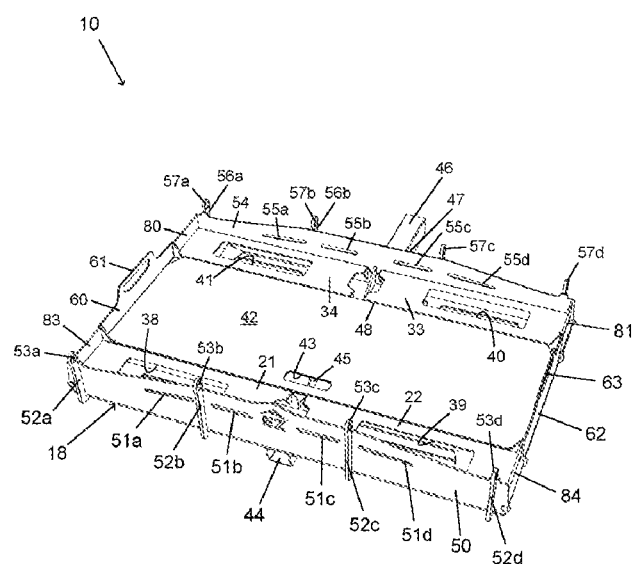
FIG. 5 is an upper front view of the multi-purpose cargo carrier of FIG. 2 shown unattached from the vehicle, its extendable tie-down removed, its bicycle wheel holders in the closed, folded, collapsed or stowed position, and the cover to the storage compartment in a closed position.
Figure 6:
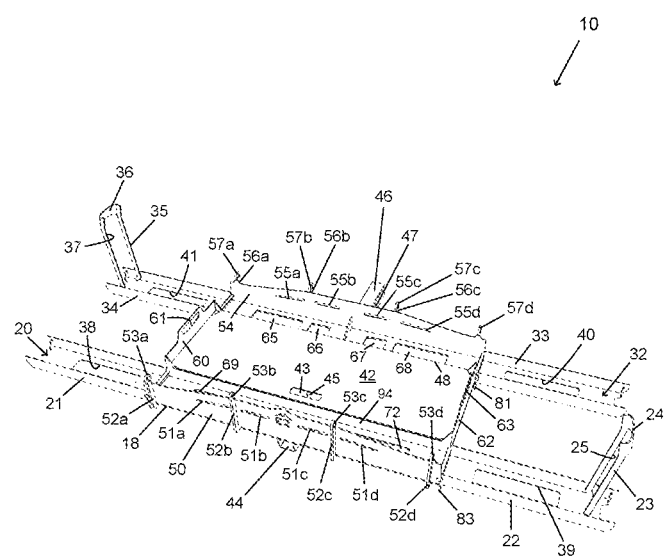
FIG. 6 is an upper front view of the multi-purpose cargo carrier of FIG. 5 with the bicycle wheel holders in an open, unfolded, un-collapsed, or extended position.

For the purposes of promoting an understanding of the principles of the invention, reference will now be made to an embodiment illustrated in the drawings and specific language will be used to describe the same. It will nevertheless be understood that no limitation of the scope of the invention is thereby intended. Any alterations and further modifications in the described embodiment, and any further applications of the principles of the invention as described herein are contemplated as would normally occur to one skilled in the art to which the invention relates.

DETAILED DESCRIPTION OF THE INVENTION

Referring to the Figures and, particularly FIG. 1, there is depicted a rear end of an exemplary vehicle 12 to which is attached a multi-purpose cargo carrier 10 fashioned in accordance with the present principles. The multi-purpose cargo carrier 10 is attached to a tow hitch (not seen) of the vehicle 12, the tow hitch being preferably, but not necessarily, a typical rectangular tow hitch such as is known in the art and standard on certain vehicles or added thereto after vehicle manufacture. Other types may be used.

Referring additionally to FIGS. 2-9, various views of the present multi-purpose cargo carrier 10 are depicted that illustrate and/or aid in explaining the various features, functions, qualities, characteristics, and/or the like of the present multi-purpose cargo carrier 10. The multi-purpose cargo carrier has a body preferably, but not necessarily, formed generally as a platform 18 that is preferably, but not necessarily, rectangular in shape, such that long sides thereof extend essentially parallel to the back of the vehicle. In the present embodiment, the multi-purpose cargo carrier 10 accommodates two (2) bicycles via two (2) bicycle lanes, guides, or ways (collectively, lanes) 32, 20 which may arbitrarily be considered first and second bicycle lanes. The first bicycle lane 32 is situated on or about a rear or rearward portion of the platform 18, while the second bicycle lane 20 is situated on or about a front or frontward portion of the platform 18. In FIG. 1 only a single bicycle 14 is shown on the carrier 10. The bicycle 14 is in/on the front bicycle lane 20 and is shown without tie or hold down straps or other securing means. A first front bicycle wheel holder 22 with its first front bicycle wheel stand 23 of the front bicycle lane 20 is shown in an extended position and receiving the front wheel 16 of the bicycle 14. A first rear bicycle wheel holder 21 of the front bicycle lane 20 is also shown in an extended position and receiving the rear wheel 15 of the bicycle 14. A second front bicycle wheel holder 34 and its second front bicycle wheel stand 35 of the rear bicycle lane 32, and a second rear bicycle wheel holder 33 of the rear bicycle lane 32 are in a closed position in FIGS. 1-5, and 7 (and at least partially to fully extended in FIGS. 6, and 8-9). A storage compartment 89 (see FIG. 4) is situated between the front and rear bicycle lanes 20, 32. A lid 42 has a hinge 48 that allows selective covering (e.g. open and closed) of the storage compartment 89. The storage compartment lid 42 defines an upper surface which, when closed and covering the storage compartment 89 (see, e.g., FIGS. 1-3 and 5-6), defines a substantially planar support for coolers, containers and/or other cargo.

The body 18 is made from a suitable material to hold sturdy bicycles and other cargo but still be manageable to attach and detach it to the vehicle's tow hitch, such as aluminum, steel, composite, and/or a combination of same, or the like. The multi-purpose cargo carrier 10 holds regular or typical bicycles up to sturdy and/or heavy bicycles, such as mountain bicycles, electric bicycles, hybrid bicycles and the like, as well as small mopeds. A multi-purpose cargo carrier fashioned in accordance with the present principles may hold more that two (2) bicycles if desired, while still providing a support adequate in size to receive and hold various cargo.

Figure 7:
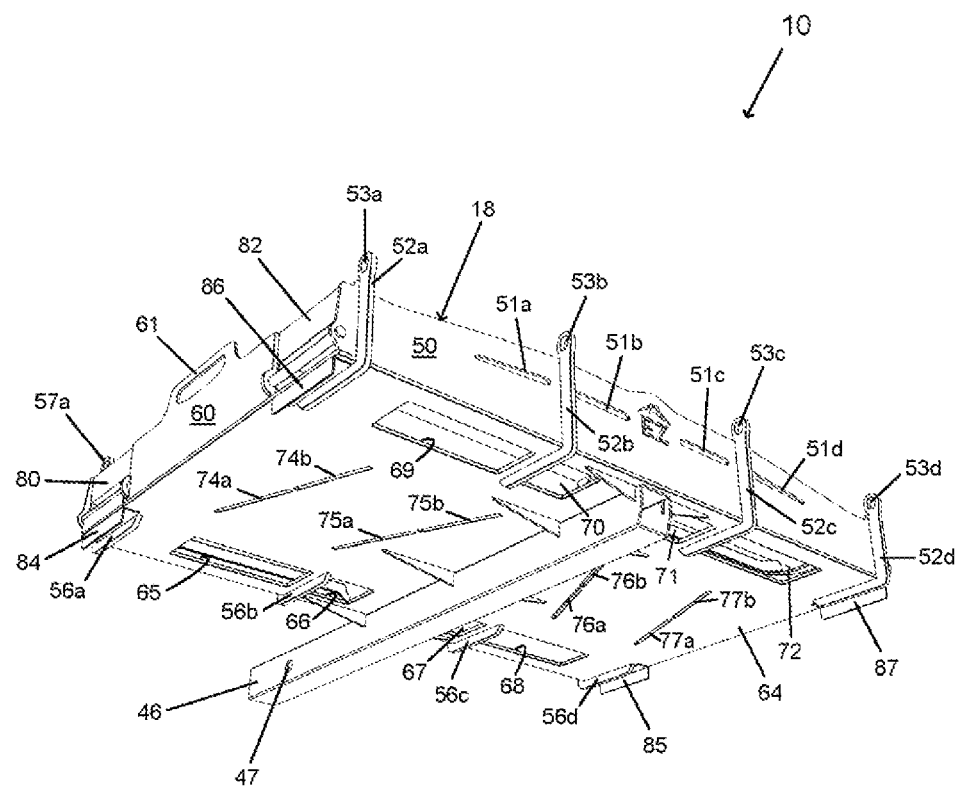
FIG. 7 is a lower front view of the multi-purpose cargo carrier of FIG. 2 shown unattached from the vehicle, the extendable tie-down removed, and the bicycle wheel holders in the closed, folded, collapsed, or stowed position.
Figure 8:
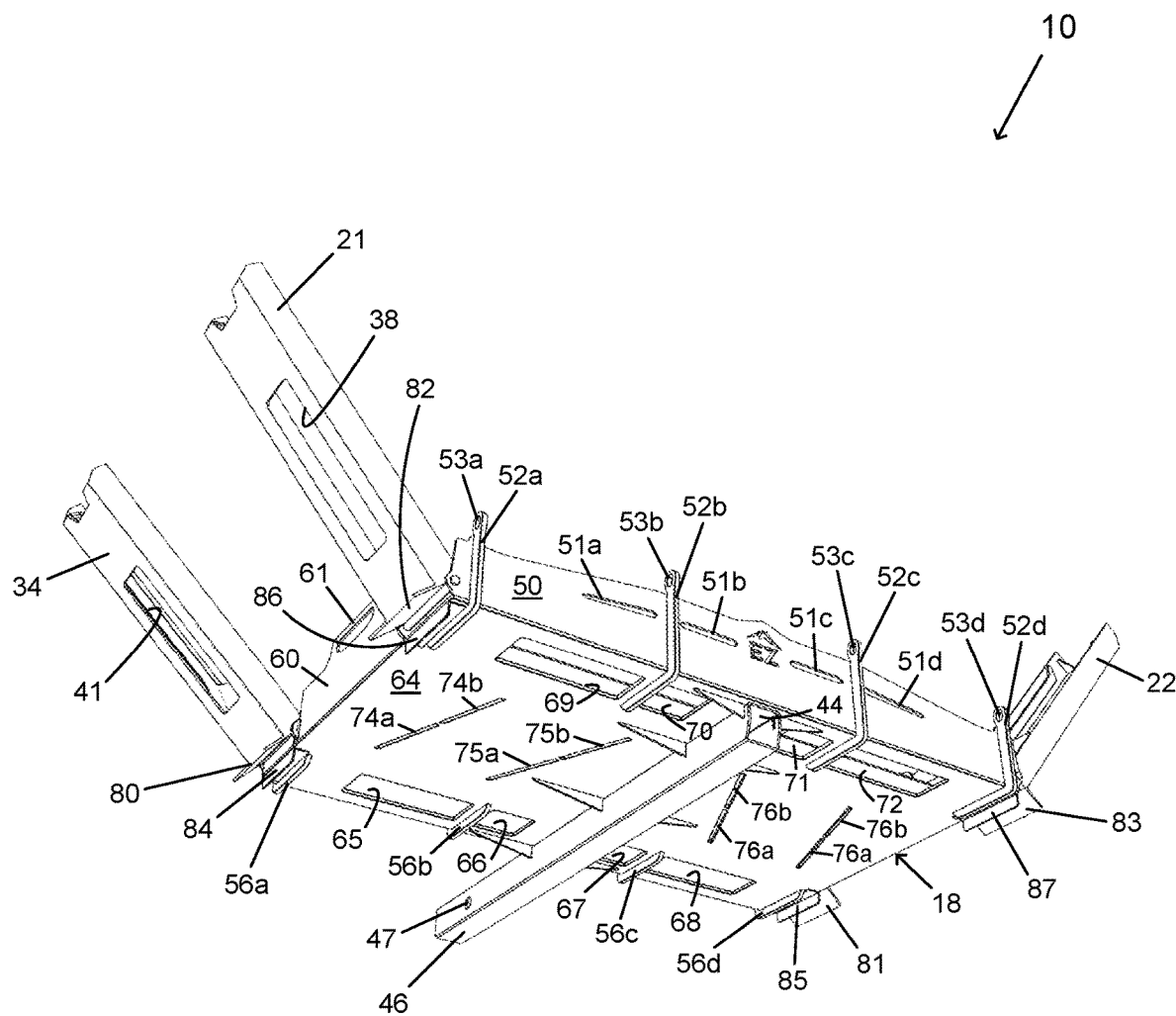
FIG. 8 is the lower front view of the multi-purpose cargo carrier of FIG. 7 with the first portions of the two bicycle wheel holders shown in a partially open position.
Figure 9:
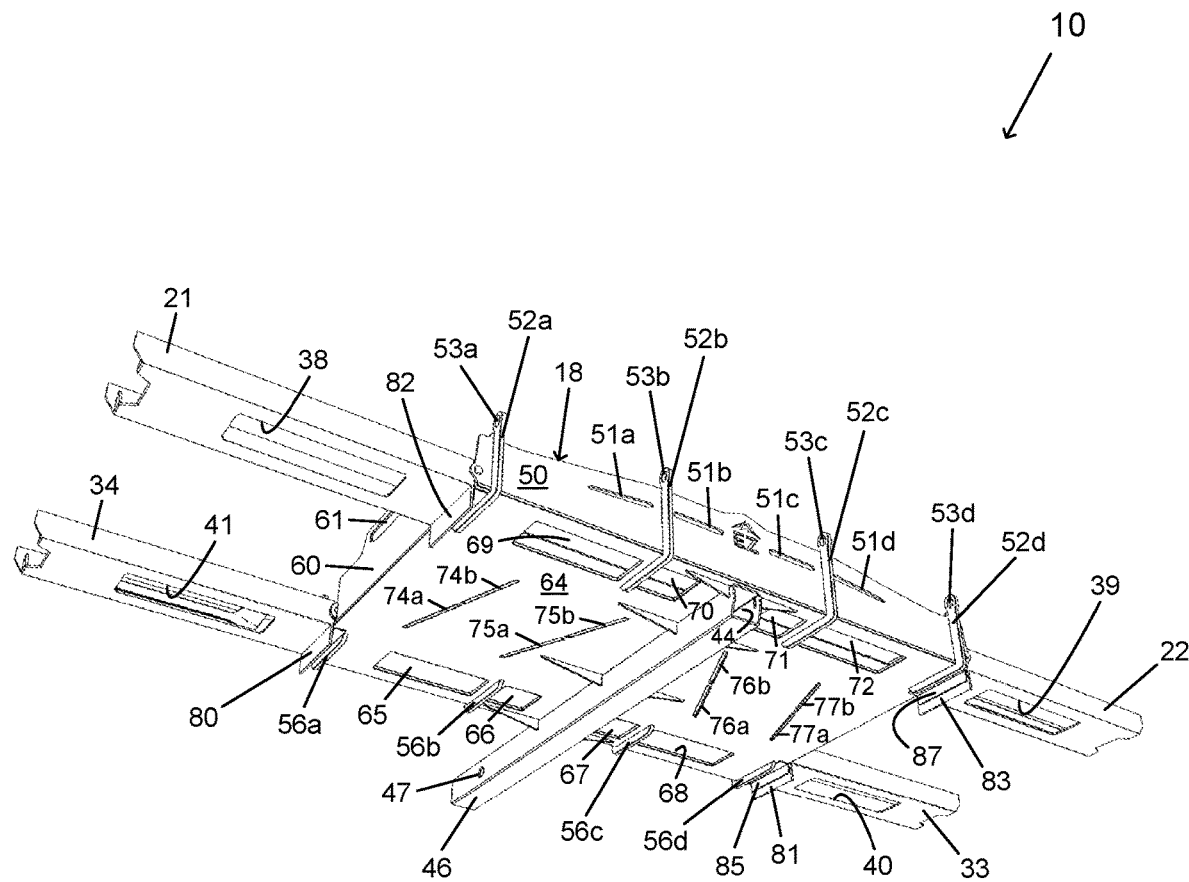
FIG. 9 is the lower front view of the multi-purpose cargo carrier of FIG. 8 with the first portions of the two bicycle wheel holders shown in a fully open position.

As best seen in FIGS. 7-9, the underside or bottom 64 of the body 18 has a shaft or tube 46 with a generally, but not necessarily, hollow interior that extends from the front of the body to and beyond the rear of the body 18. The shaft 46 is sized such that the portion which extends beyond the rear of the body 18 is receivable in the vehicle's tow hitch. As such, the shaft 46 has a bore 47 through opposite side walls of the shaft 46 for receiving a hitch pin (not shown) or the like for securing the shaft 46 in the vehicle's tow hitch. The portion 44 of the shaft 46 at the front of the body 18 is sized to receive a bar 27 of a tie-down arm 26. The tie-down arm 26 is adjustable in length relative to the body 18 by sliding the bar 27 within the shaft 46. The tie-down arm 26 further has a cross-plate 28 at one end of the bar 27 (opposite the end of the bar 27 that is received in the portion 44 of the shaft 46) that has a first eyelet 29 on a first lateral side of the cross-plate 28, and a second eyelet 30 on a second lateral side of the cross-plate 28, the nomenclature first and second being arbitrary. The first and second eyelets 29, 30 each provide a place to use, attach, and/or tie down a holding or tie-down strap, hooked rope, bungee cord, and/or all other types of cargo hold down devices. This is true of all other eyelets, eyes, bores, slots, holes and/or the like as described herein ("receptors"). While the cross-plate 28 is shown having two (2) eyelets, the cross-plate 28 may have a single eyelet or more than two (2) eyelets. Other types of receptors may be used.

The multi-purpose cargo carrier 10 has a front face or wall 50 distal to the end of the vehicle 12, and a rear face or wall 54 opposite the front face 50 that is proximate to the end of the vehicle 12. Inward from the front face or wall 50 is a first secondary wall 94 defining a space between the two walls 50, 94 that at least partially defines a front bicycle lane, area, guide, or the like (collectively, lane) 20. Inward from the rear face or wall 54 is a second secondary wall 95 defining a space between the two walls 54, 95 that at least partially defines a rear bicycle lane, area, guide, or the like (collectively, lane) 32. The storage compartment 89 is further defined between the first secondary wall 94 and the second secondary wall 95 and a first lateral side wall 62 and a second lateral side wall 60 opposite the first lateral side wall 62, the nomenclature first and second being arbitrary. The first lateral side wall 62 has a handle-like structure 63 that defines a hold down. The second lateral side wall 60 has a handle-like structure 61 that defines a hold down. A partition 91 preferably, but not necessarily, extends from the first secondary wall 94 to the second secondary wall 95 to define a first enclosure 90 and a second enclosure 92 for receiving and holding cargo, the nomenclature first and second being arbitrary. The bottom 64 of the platform 18/storage compartment 89 may include a plurality of slots or other openings. Particularly, a first set of slots 74a, 74b and a second set of slots 75a, 75b are each situated along a diagonal within the first enclosure 90. Other configurations may be used. A third set of slots 76a, 76b and a fourth set of slots 77a, 77b are each situated along a diagonal within the second enclosure 91. Other configurations may be used.

The first front bicycle wheel holder 22 is hinged to a second lateral side 97 of the platform 18 and folds or collapses into a portion of the front bicycle lane 20 proximate the second lateral side 97. The first front bicycle wheel stand 23 of the first front bicycle wheel holder 22 folds or collapses into the first front bicycle wheel holder 22. The first front bicycle wheel holder 22 has a generally oval opening 39 that is configured to receive a lower portion of a front wheel of a bicycle. The first front bicycle wheel stand 23 also has a generally oval opening 25 and a curved top 24 that are configured to receive a front portion of the front wheel of the bicycle. The first rear bicycle wheel holder 21 is hinged to a first lateral side 96 of the platform 18 and folds or collapses into a portion of the front bicycle lane 20 proximate the first lateral side 96. The first rear bicycle wheel holder 21 has a generally oval opening 38 that is configured to receive a lower portion of a rear wheel of a bicycle.

As best seen in and understood from FIGS. 7-9, the first front bicycle wheel holder 22 and the first rear bicycle wheel holder 21 pivot from a closed/folded/collapsed position (see, e.g., FIGS. 3 and 7) through an intermediate stage (FIG. 8) to an open/unfolded/expanded position (FIG. 9) such that the first front and first rear bicycle wheel holders 22, 21 are essentially co-planar with the top of the platform 18 in order for the front bicycle lane 20 to receive a bicycle. In order to provide strength, prevent over extension, and other reasons, a lower portion of the first front wheel holder 22 has a flange, plate or the like 83 that is positioned to contact and stop against a flange, plate or the like 87 on the underside 64 of the platform 18 proximate the second lateral side 97 when the first front wheel holder 22 pivots into the fully extended or open position (FIG. 9). Again, in order to provide strength, prevent over extension, and other reasons, a lower portion of the first rear wheel holder 21 has a flange, plate or the like 82 that is positioned to contact and stop against a flange, plate or the like 86 on the underside 64 of the platform 18 proximate the first lateral side 96 when the first rear wheel holder 21 pivots into the fully extended or open position (FIG. 9).

The second front bicycle wheel holder 34 is hinged to a first lateral side 96 of the platform 18 and folds or collapses into a portion of the rear bicycle lane 32 proximate the first lateral side 96. The second front bicycle wheel stand 35 of the second front bicycle wheel holder 34 folds or collapses into the second front bicycle wheel holder 34. The second front bicycle wheel holder 34 has a generally oval opening 41 that is configured to receive a lower portion of a front wheel of a bicycle. The second front bicycle wheel stand 35 also has a generally oval opening 37 and a curved top 36 that are configured to receive a front portion of the front wheel of the bicycle. The second rear bicycle wheel holder 33 is hinged to the second lateral side 97 of the platform 18 and folds or collapses into a portion of the rear bicycle lane 32 proximate the second lateral side 97. The second rear bicycle wheel holder 33 has a generally oval opening 40 that is configured to receive a lower portion of a rear wheel of a bicycle.

As best seen in and understood from FIGS. 7-9, the second front bicycle wheel holder 34 and the second rear bicycle wheel holder 33 pivot from a closed/folded/collapsed position (see, e.g., FIGS. 3 and 7) through an intermediate stage (FIG. 8) to an open/unfolded/expanded position (FIG. 9) such that the second front and first rear bicycle wheel holders 34, 33 are essentially co-planar with the top of the platform 18 in order for the rear bicycle lane 32 to receive a bicycle. In order to provide strength, prevent over extension, and other reasons, a lower portion of the second front wheel holder 34 has a flange, plate or the like 80 that is positioned to contact and stop against a flange, plate or the like 84 on the underside 64 of the platform 18 proximate the first lateral side 96 when the second front wheel holder 34 pivots into the fully extended or open position (FIG. 9). Again, in order to provide strength, prevent over extension, and other reasons, a lower portion of the second rear wheel holder 33 has a flange, plate or the like 81 that is positioned to contact and stop against a flange, plate or the like 85 on the underside 64 of the platform 18 proximate the second lateral side 97 when the second rear wheel holder 33 pivots into the fully extended or open position (FIG. 9).

As best seen in FIGS. 7-9, the bottom 64 of the platform 18 preferably, but not necessarily, has several openings that are situated along the first and second bicycle lanes 20, 32. Particularly, a first rectangular opening 65 and an adjacent second rectangular opening 66 are situated in the rear bicycle lane/lane area 32 proximate the first lateral side 96 and within the first enclosure 90 of the storage compartment 89, while a third rectangular opening 67 and an adjacent fourth rectangular opening 68 are situated in the rear bicycle lane/lane area 32 proximate the second lateral side 97 and within the second enclosure 91 of the storage compartment 89. The first rectangular opening 65 is under the opening 41 of the second front wheel holder 34. The fourth rectangular opening 68 is under the opening 40 of the second rear wheel holder 33. A fifth rectangular opening 69 and an adjacent sixth rectangular opening 70 are situated in the front bicycle lane/lane area 20 proximate the first lateral side 96 and within the first enclosure 90 of the storage compartment 89, while a seventh rectangular opening 71 and an adjacent eighth rectangular opening 72 are situated in the front bicycle lane/lane area 20 proximate the second lateral side 97 and within the second enclosure 91 of the storage compartment 89. The fifth rectangular opening 69 is under the opening 38 of the first rear wheel holder 21. The eighth rectangular opening 72 is under the opening 39 of the first front wheel holder 22.

The body 18 has a plurality of first ribs, generally designated 52, along the front wall 50 and the adjoining underside 64. Particularly, four (4) ribs 52a, 52b, 52c, and 52d are shown. Each first rib 52a, 52b, 52c, and 52d has an eyelet, generally designated 53, at its apex, particularly, eyelets 53a, 53b, 53c, and 53d. The first ribs 52a, 52b, 52c, and 52d are preferably but not necessarily, spaced along the front of the body as shown. However, the number of first ribs and their spacing may change as desired. The body 18 further has a plurality of second ribs, generally designated 56, along the rear wall 54 and the adjoining underside 64. Particularly, four (4) ribs 56a, 56b, 56c, and 56d are shown. Each second rib 56a, 56b, 56c, and 56d has an eyelet, generally designated 57, at its apex, particularly, eyelets 57a, 57b, 57c, and 57d. The second ribs 56a, 56b, 56c, and 56d are preferably but not necessarily, spaced along the rear of the body as shown. However, the number of second ribs and their spacing may change as desired. The ribs give strength and/or rigidity to the body 18 and provide a solid tie or hold down foundation for the eyelets of the ribs. While not numbered in the figures, the shaft 46 on the underside 64 of the platform 18 is shown supported by triangular braces along its contact length with the underside 64. More, less, or no braces may be used as well as other shapes if desired.

The multi-purpose cargo carrier 10 has a plurality of places (catches) to attach, extend through, or otherwise allow the use of tie or hold down devices such as, but not limited to, flat straps with or without ratchets, bungee cords, rope, etc. with or without hooks, clasps, or fasteners. The ribs and eyelets, and various slots are part of the plurality of catches about the body 18. Other catches include a plurality of slots 51a, 51b, 51c, 51d in the front wall/face/plate 50, and a plurality of slots 55a, 55b, 55c, and 55d in the rear wall/face/plate 54 that may be used as strap receptors. A catch 45 is disposed along, in, and/or adjacent to the front bicycle lane 20, at an end of the partition/divider 91 of the storage compartment 89. The catch 45 may include one or more eyelets or the like and is accessible when the lid 42 is both open (see, e.g., FIG. 2) and closed (see, e.g., FIG. 4). The lid 42 has an opening 45 that allows access to the catch 43 when the lid 42 is closed.

It is easily discerned that the present multi-purpose cargo carrier 10 may hold a single bicycle, either in the front or rear bicycle lane 20, 32, two bicycles with one bicycle in each bicycle lane 20, 32 with or without cargo in the storage compartment 89 and/or carried on the lid/support 42, or with just cargo and no bicycles.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A multi-purpose cargo carrier for attachment to a tow hitch of a vehicle comprising:
    a generally rectangular platform defining a top, a bottom opposite the top, a front, a rear opposite the front, a first lateral side, and a second lateral side opposite the first lateral side;
    a tow hitch bar having a first end and a second end, the first end extending from the bottom and the rear of the platform between the first lateral side and the second lateral side, and configured for receipt by the tow hitch of the vehicle;
    a first bicycle lane extending along the rear of the platform between the first lateral side and the second lateral side that supports a first front wheel and a first rear wheel of a first bicycle, and having a first front wheel holder pivotally connected to the first lateral side of the platform, and a first rear wheel holder pivotally connected to the second lateral side of the platform, the first front wheel holder having a first front wheel opening that receives a lower portion of the front wheel of the first bicycle and a first extension that pivots away from the first front wheel holder to form a generally vertical stand that receives a front portion of the first front wheel of the first bicycle, the first rear wheel holder having a first rear wheel opening that receives a lower portion of the rear wheel of the first bicycle;
    a second bicycle lane extending along the front of the platform between the first lateral side and the second lateral side that supports a second front wheel and a second rear wheel of a second bicycle, and having a second front wheel holder pivotally connected to the second lateral side of the platform, and a second rear wheel holder pivotally connected to the first lateral side of the platform, the second front wheel holder having a second front wheel opening that receives a lower portion of the front wheel of the second bicycle and a second extension that pivots away from the second front wheel holder to form a generally vertical stand that receives a front portion of the second front wheel of the second bicycle, the second rear wheel holder having a second rear wheel opening that receives a lower portion of the rear wheel of the second bicycle;
    a storage compartment in the platform between the first bicycle lane and the second bicycle lane;
    a storage compartment lid hinged to the platform and having an upper surface defining a support for cargo; and
    a plurality of tie downs strategically situated about the platform.

2. The multi-purpose cargo carrier of claim 1, wherein the plurality of tie downs comprise one or both of, a plurality of slots situated in and about the platform, and a plurality of eyelets extending from the platform.

3. The multi-purpose cargo carrier of claim 2, wherein each one of the plurality of eyelets extends from a rib formed on the platform.

4. The multi-purpose cargo carrier of claim 1, wherein:
the storage compartment has a dual eyehole providing two tie down connection locations; and
the lid has a cutout that allows access to the dual eyehole when the lid is closed.

5. The multi-purpose cargo carrier of claim 1, further comprising:
a tie down arm adjustably extending from the bottom and the front of the platform between the first lateral side and the second lateral side of the platform.

6. The multi-purpose cargo carrier of claim 5, wherein the tie down arm adjustably extends from the second end of the tow hitch bar.

7. The multi-purpose cargo carrier of claim 1, wherein:
the first front wheel holder includes a first front wheel plate configured to contact the platform and stop pivoting of the first front wheel holder when the first front wheel holder is generally co-planar with the platform;
the first rear wheel holder includes a first rear wheel plate configured to contact the platform and stop pivoting of the first rear wheel holder when the first rear wheel holder is generally co-planar with the platform;
the second front wheel holder includes a second front wheel plate configured to contact the platform and stop pivoting of the second front wheel holder when the second front wheel holder is generally co-planar with the platform; and
the second rear wheel holder includes a second rear wheel plate configured to contact the platform and stop pivoting of the second rear wheel holder when the second rear wheel holder is generally co-planar with the platform.

8. The multi-purpose cargo carrier of claim 1, wherein the storage compartment extends from the front of the platform to the rear of the platform, and from the first lateral side of the platform to the second lateral side of the platform.

9. The multi-purpose cargo carrier of claim 2, further comprising:
a front face extending along the front of the platform from the first lateral side to the second lateral side and having a front face height;
a first subset of the slots of the plurality of tie downs are disposed in the front face;
a rear face extending along the rear face of the platform from the first lateral side to the second lateral side and having a rear face height; and
a second subset of the slots of the plurality of tie downs are disposed in the front face.

10. The multi-purpose cargo carrier of claim 9, further comprising:
a first lateral side face extending along the first lateral side of the platform between the front of the platform adjacent the second rear wheel holder and the rear of the platform adjacent the first front wheel holder and having a first lateral side face height, and a first oval slot at a top of the first lateral side face defining one of the plurality of tie downs; and
a second lateral side face extending along the second lateral side of the platform between the front of the platform adjacent the second front wheel holder and the rear of the platform adjacent the first rear wheel holder, and having a second lateral side face height, and a second oval slot at a top of the second lateral side face defining one of the plurality of tie downs.

11. The multi-purpose cargo carrier of claim 10, further comprising:

a first wall proximate the front of the platform and extending between the first lateral side face and the second lateral side face, the first wall having a first wall height; and
a second wall proximate the rear of the platform and extending between the first lateral side face and the second lateral side face, the second wall having a second wall height.

12. The multi-purpose cargo carrier of claim 11, wherein the first wall height, the second wall height, the first lateral side face height, and the second lateral side face height are equal and form a boundary about the lid.

13. A cargo carrier configured for attachment to a tow hitch of a vehicle comprising:
a generally rectangular body having a top, a bottom opposite the top, a front, a rear opposite the front, a first lateral side, and a second lateral side opposite the first lateral side;
a hollow rectangular bar having a first end, a second end, and extending along the bottom of the body from the front to the rear, the first end extending outwardly from the rear of the body and configured for reception in the tow hitch of the vehicle, the second end terminating at the front of the body;
a tie down arm adjustably extending from the second end of the hollow rectangular bar;
a first bicycle area defined along the rear of the body between the first lateral side and the second lateral side that receives a first bicycle having a first front wheel and a first rear wheel, the first bicycle area having a first front wheel holder pivotally connected to the first lateral side of the platform, and a first rear wheel holder pivotally connected to the second lateral side of the platform, the first front wheel holder having a first front wheel opening that receives a lower portion of the front wheel of the first bicycle and a first extension that pivots away from the first front wheel holder to form a generally vertical stand that receives a front portion of the first front wheel of the first bicycle, the first rear wheel holder having a first rear wheel opening that receives a lower portion of the rear wheel of the first bicycle;
a second bicycle lane extending along the front of the platform between the first lateral side and the second lateral side that supports a second bicycle having a second front wheel and a second rear wheel, and having a second front wheel holder pivotally connected to the second lateral side of the platform, and a second rear wheel holder pivotally connected to the first lateral side of the platform, the second front wheel holder having a second front wheel opening that receives a lower portion of the front wheel of the second bicycle and a second extension that pivots away from the second front wheel holder to form a generally vertical stand that receives a front portion of the second front wheel of the second bicycle, the second rear wheel holder having a second rear wheel opening that receives a lower portion of the rear wheel of the second bicycle;
a storage compartment in the body between the first bicycle lane and the second bicycle lane, the storage compartment having a storage depth;
a lid hinged to the body to selectively cover and uncover the storage compartment, the lid having an upper surface defining a support for cargo when the lid covers the storage compartment;
a plurality of slots situated in and about the platform sized to receive tie down straps, and a plurality of eyelets each one which extend from a rib formed about the body.

14. The cargo carrier of claim 13, further comprising:
a dual eyehole in the storage compartment providing two tie down connection locations; and
the lid has a cutout that allows access to the dual eyehole when the storage compartment is covered by the lid.

15. The cargo carrier of claim 13, wherein:
the first front wheel holder includes a first front wheel plate configured to contact the body and stop pivoting of the first front wheel holder when the first front wheel holder is generally co-planar with the body;
the first rear wheel holder includes a first rear wheel plate configured to contact the body and stop pivoting of the first rear wheel holder when the first rear wheel holder is generally co-planar with the body;
the second front wheel holder includes a second front wheel plate configured to contact the body and stop pivoting of the second front wheel holder when the second front wheel holder is generally co-planar with the body; and
the second rear wheel holder includes a second rear wheel plate configured to contact the body and stop pivoting of the second rear wheel holder when the second rear wheel holder is generally co-planar with the body.

16. The multi-purpose cargo carrier of claim 13, wherein the storage compartment extends from the front of the body to the rear of the body, and from the first lateral side of the body to the second lateral side of the body.

17. The multi-purpose cargo carrier of claim 14, further comprising:
a front face extending along the front of the body from the first lateral side to the second lateral side and having a front face height;
a first plurality of tie down slots disposed in the front face;
a rear face extending along the rear face of the body from the first lateral side to the second lateral side and having a rear face height; and
a second plurality of tie down slots disposed in the front face.

18. The multi-purpose cargo carrier of claim 17, further comprising:
a first lateral side face extending along the first lateral side of the body between the front of the body adjacent the second rear wheel holder and the rear of the body adjacent the first front wheel holder and having a first lateral side face height, and a first oval tie down slot at a top of the first lateral side face; and
a second lateral side face extending along the second lateral side of the body between the front of the body adjacent the second front wheel holder and the rear of the body adjacent the first rear wheel holder, and having a second lateral side face height, and a second oval tie down slot at a top of the second lateral side face.

19. The multi-purpose cargo carrier of claim 18, further comprising:
a first wall proximate the front of the body and extending between the first lateral side face and the second lateral side face, the first wall having a first wall height; and
a second wall proximate the rear of the body and extending between the first lateral side face and the second lateral side face, the second wall having a second wall height.

20. The multi-purpose cargo carrier of claim 19, wherein the first wall height, the second wall height, the first lateral side face height, and the second lateral side face height are equal and form a boundary about the lid.

* * * * *